United States Patent

[11] 3,550,559

[72] Inventors Robert L. Long
 6307 Martins Lane, Lanham, Md. 20801;
 Lawrence H. Friason, 5712 Gallaway
 Drive, Oxon Hill, Md. 20021
[21] Appl. No. 769,896
[22] Filed Oct. 23, 1968
[45] Patented Dec. 29, 1970

[54] ANIMAL ENCLOSURE
 5 Claims, 6 Drawing Figs.
[52] U.S. Cl. ................................................ 119/20,
 49/410
[51] Int. Cl. ............................................. A01k 01/02
[50] Field of Search ........................................ 119/20;
 49/409, 410

[56] References Cited
UNITED STATES PATENTS

| | | | |
|---|---|---|---|
| 922,612 | 5/1909 | Mull | 49/410 |
| 1,041,881 | 10/1912 | Rumsey | 49/410 |
| 2,610,830 | 9/1952 | Beatty | 119/20X |
| 2,808,626 | 10/1957 | Sassano | 49/409X |

Primary Examiner—Hugh R. Chamblee
Attorney—Stowell & Stowell

ABSTRACT: A dog kennel having a sliding gate construction. The gate is suspended from an inverted channel by roller elements and rocking about the axis of the channel is inhibited by a pintle and slot arrangement at the bottom of the gate. The kennel is formed of wire panels and pipe elements.

ROBERT L. LONG
LAWRENCE H. FRIASON
INVENTORS

BY Stowell & Stowell
ATTORNEY

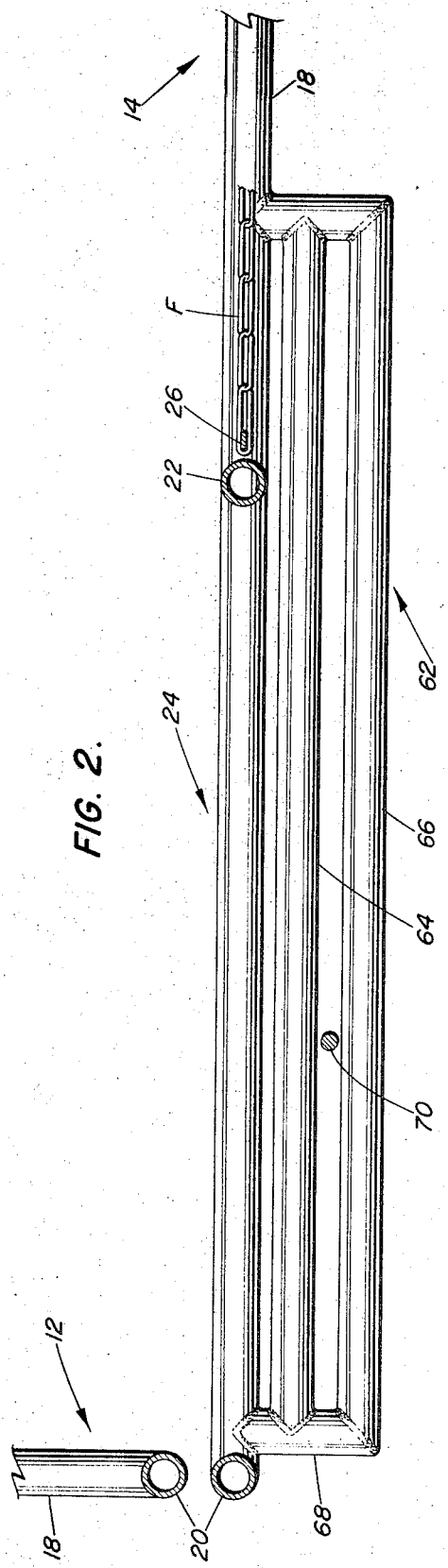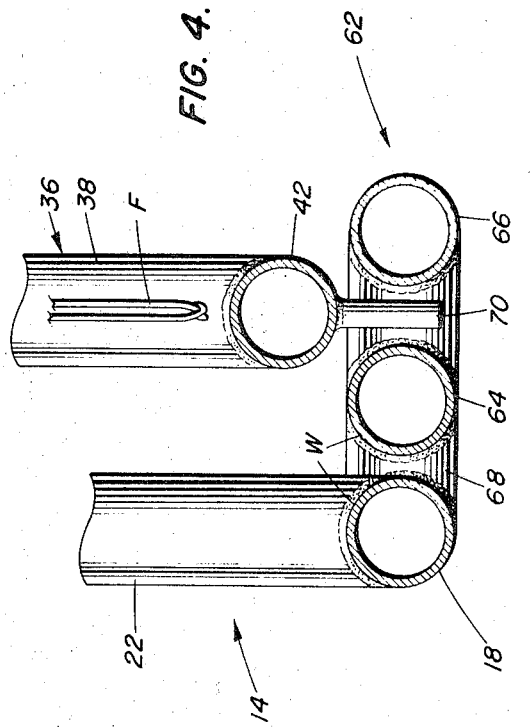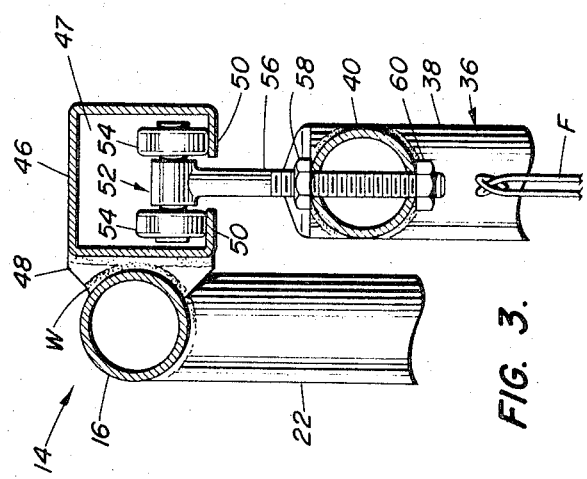
ROBERT L. LONG
LAWRENCE H. FRIASON
INVENTORS
BY Stowell & Stowell
ATTORNEY

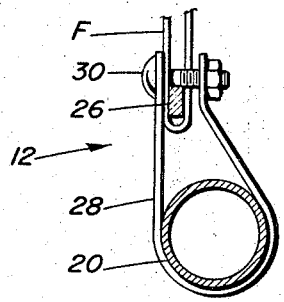
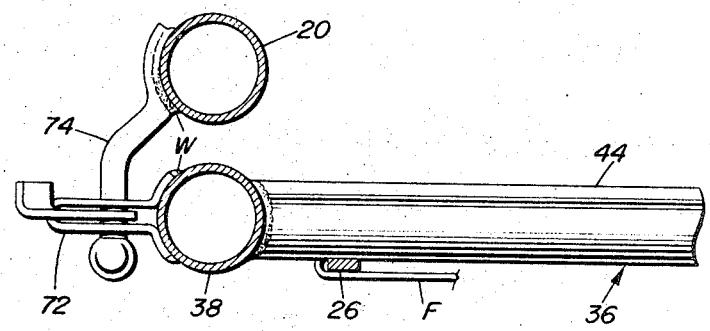
FIG. 5.
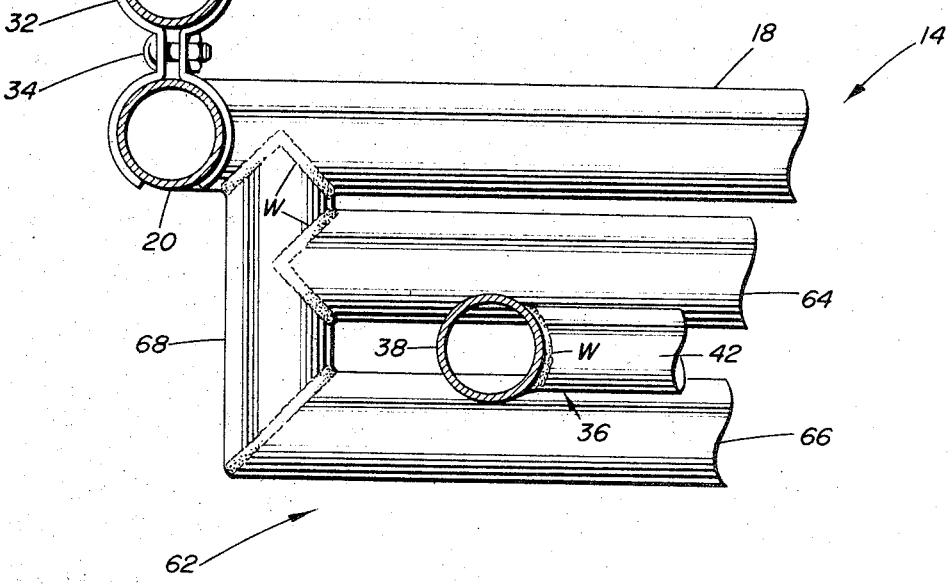
FIG. 6.
INVENTORS
ROBERT L. LONG
LAWRENCE H. FRIASON
BY *Stowell & Stowell*
ATTORNEY

ANIMAL ENCLOSURE

This invention relates to an animal enclosure and more particularly to an enclosure for maintaining dogs. In general, the enclosure is defined by a generally rectangular array of upstanding wire mesh panels, each of which is preferably fabricated from a cross-linked array of wires coated with a smooth rust inhibiting coating, such as galvanized wire. According to the design location of the animal enclosure, one or more of the panels may be omitted and a portion of an adjacent static structure, such as a home or other building, may be substituted.

It has often been the practice of fabricators of dog kennels to employ a variety of pivoted gate constructions for closing off access openings in enclosures. That is to say, the dog kennel art has often utilized gates or other closure members which swing about a vertical axis in order to provide access to and from the interior of the enclosure. In distinction with this construction, the subject construction utilizes a sliding closure type of access for the kennel enclosure. According to the invention this action is realized by an inverted rectangular channel suspendedly supporting a slidng access closure. This same channel further defines, in addition to a guide and suspension for the sliding enclosure, an integral portion of the coupling between two of the several panel elements employed in the enclosure.

Further, according to the practice of this invention, an animal enclosure is fabricated from a wire fabric of more or less ready commercial availability and of pipe elements also of ready and relatively inexpensive availability. While not necessary for the practice of the invention, it has been found convenient to employ a poured concrete slab as the base of the animal enclosure, with the ends of several pipes anchored or sunk in the concrete.

Further, according to the practice of the invention, stability of the sliding access closure is realized by the provision of a pintle or other projection from the bottom of the sliding closure which cooperates with a slot. This slot is defined by metallic piping, preferably of the same type employed to fabricate the upstanding posts at the several corners and also the horizontally disposed panel edges of the animal enclosure.

In this manner, an economy is effected by employing rather inexpensive materials of construction, as well as materials which will possess the same coefficient of thermal expansion to thereby minimize stresses during ambient temperature changes.

In the drawings:

FIG. 2 is a line taken along axis 2-2 of FIG. 1;

FIG. 3 is a view taken along section 3-3 of FIG. 1;

FIG. 4 is a view taken along section 4-4 of FIG. 1;

FIG. 5 is a view taken along section 5-5 of FIG. 1; and

FIG. 6 is a view taken along section 6-6 of FIG. 1.

Figure 1:
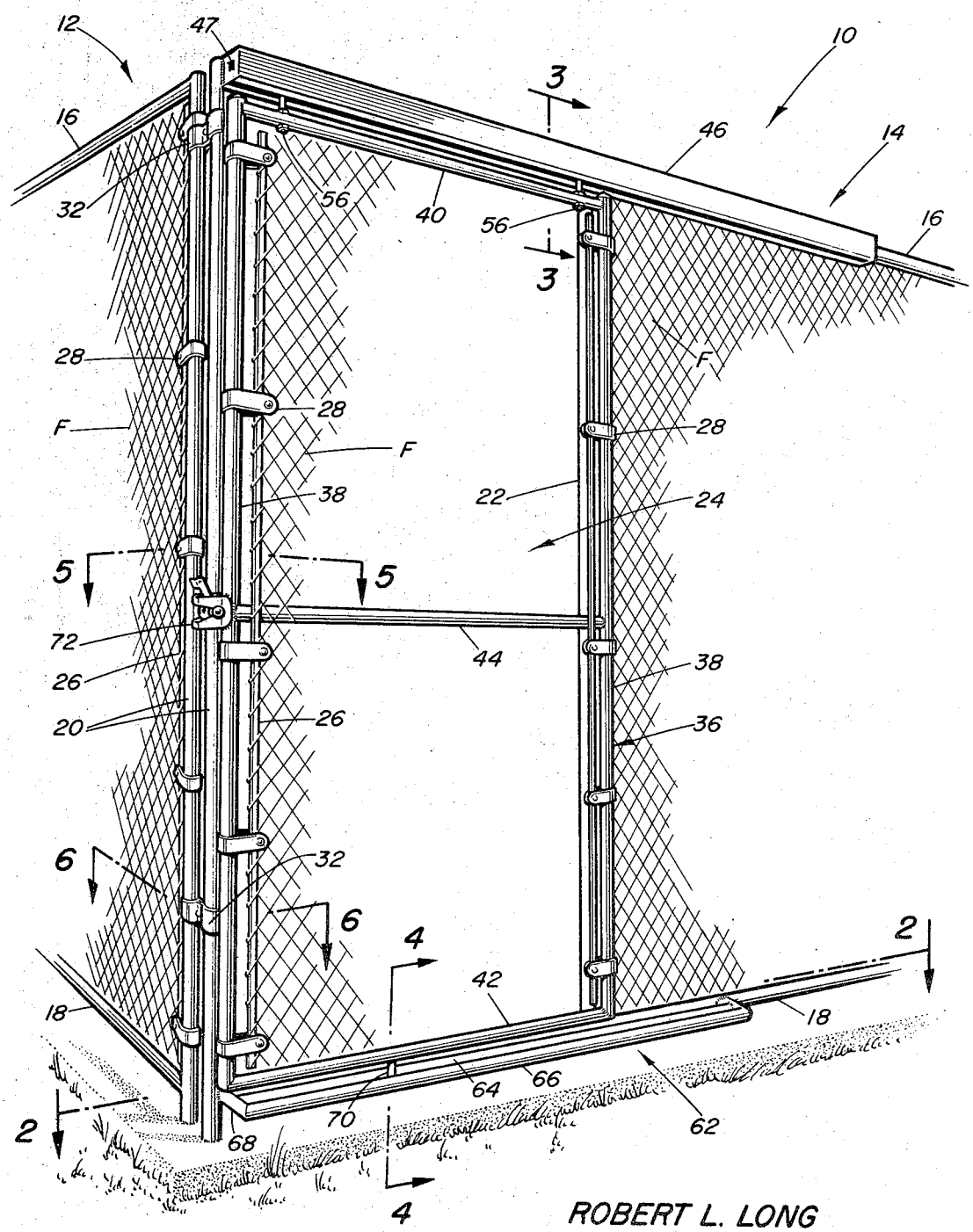
FIG. 1 is a perspective view of a corner portion of an animal enclosure fabricated according to this invention and showing a sliding closure.

Referring now to the drawings, the numeral 10 denotes generally an animal enclosure constructed in accordance with the present invention. The numeral 12 denotes generally one of a plurality of upstanding panels which together define the walls of the enclosure. The numeral 14 denotes another one of these upstanding panels, this panel being provided with a slidable access closure. The numeral 16 denotes either top and horizontally running pipe element which define the top edge member of each of the panels 12 and 14. The numerals 18 denote the counterpart for the lowermost of the pipe elements of each panel.

The numeral 20 denotes either of two vertically extending pipe elements which each define one end of panels 10 and 12. It will be observed that the pipes 20 may be embedded in a concrete base which can form the bottom of the enclosure. The numeral 22 denotes a vertically disposed pipe element extending between lower horizontal pipe 18 and upper horizontal pipe 16 of panel 14. As illustrated at FIGS. 2 and 4 of the drawings, the ends of pipe 22 are cut so as to fit over the surfaces of the pipes between which they are supported. Preferably, the pipes are braized or welded to each other as denoted by the letter W in the drawings.

Referring again to FIGS. 1 and 2, it will be observed that for panel 14 the channel member 46 (to be later described), the lower pipe 18, and the vertically disposed pipes 20 and 22 define a generally rectangular access opening 24.

A sliding access panel is formed of preferably the same materials of construction as employed in the fabrication of the panels themselves. The numeral 26 denotes any of several vertically extending metal bars adapted to tension the wire mesh F of the several panels. The numeral 28 denotes one of a plurality of metal straps having bolts which pass behind the bars 26, the straps passing over the several vertically extending pipes such as 20 and 38. As shown at FIG. 5, the ends of straps 28 are fastened together by means of bolts 30. Further, as seen by reference to FIG. 5, the construction illustrated there for the panel 12 is also employed for the access closure as well as the panel 10. As illustrated at FIGS. 1 and 6, clamps 32 are joined at their mid portions by means of bolts 34 and maintain the vertically extending pipes 20 in spaced relationship to each other.

The numeral 40 denotes the upper horizontally extending pipe portion of the edge of access closure 36, while the numeral 42 denotes its counterpart at the lower end of the gate. Vertically extending pipes 38 define the other two edges of the closure. The numeral 44 denotes a generally medially disposed pipe section, similarly welded to the pipes 38.

Referring now to FIGS. 1 and 3 of the drawings, the numeral 46 denotes a generally elongated and inverted channel section welded to the upper pipe 16 of panel 14. Preferably, a plurality of bracket elements 48 are welded to both the channel and to the pipe 16 to facilitate the mounting. In one construction, the pipe 16 of panel 14 may extend only a short way beyond the right end of the channel, the left end of the channel being welded to pipe 20 of panel 14. In this manner only the channel spans the upper run of the access opening. The numeral 50 denotes either of two inturned portions of the channel which together define a slot between the edges of these portions. Numeral 52 denotes a bushing through which extends a short axle mounting two antifriction wheel elements 54. The numeral 56 denotes a bolt preferably integral with bushing 52 and which extends downward and provided with nuts 58 and 60. As shown at FIG. 3 of the drawings, the nuts 58 and 60 are employed to securely fasten the upper horizontal pipe element 40 to the bolt. Preferably, the ends of the channel element 46 are closed by plates 47. It will be understood that the access closure 36 is supported by two of the assemblies shown in detail at FIG. 3. This may be seen by reference to FIG. 1 of the drawings wherein the numeral 56 is shown at two locations in the upper pipe 40 as supporting the sliding closure.

Referring now to FIGS. 1 and 4 of the drawings, the numeral 62 denotes generally a guide arrangement for the lower end of the sliding closure 36. As shown also at FIG. 6, a pair of pipes 64 and 66 are disposed in parallel relation to each other, their ends secured as by welding to short lengths of piping 68, the latter extending out from lower running pipe 18 of panel 14 at right angles. As shown also at Figure 2 of the drawings, a slot or space is defined between the parallel pipes 64 and 66, with the plane of sliding access closure 38 extending into this area. A downwardly extending pintle 70 may be fastened as by welding to the lower gate pipe 42. The function of the pintle 70 is to maintain the sliding access closure 36 in the plane illustrated in the drawings, i.e., generally parallel to the plane of panel 14. It will be observed that the pintle 70 cooperates with the parallel extending pipe elements 64 and 66 to perform a function similar to the upper channel element 46, namely, the function of maintaining the sliding closure 36 in a single plane while sliding. Because no weight is required to be supported at the lower end of the closure 36, it has been found that a single pintle 70 will serve this purpose. It will be observed that the distance between the upper pipe 40 and the lower portion of the channel 46 (also the height of the channel) may be made somewhat greater than the distance the pintle 70 extends downward between the parallel running pipes 64 and 66. In this case, the entire closure 36 may be easily assembled (before the left end plate 47 is fixed) by sliding the closure supports 52 into the channel 46, and after the pintle 70 has passed the leftmost short piping element 68, allowing the gate to drop so that the pintle 70 now extends between the pipe elements 64 and 66.

Referring again to FIGS. 1 and 5 of the drawings, a latch mechanism may be provided for the sliding closure. A sheet metal yoke configured as illustrated may be welded to the medial portion of pipe 38 and a bolt 74 may be welded to the pipe 20, both as shown at FIG. 5 of the drawings. In operation, the illustrated latch is swung clockwise from the position shown at FIG. 1 and this allows the bolt to enter the slot in the bracket 72. Counterclockwise motion then covers the side of the bolts originally opened and the closure is not latched. It will be understood that latches such as that illustrated are available commercially.

We claim:

1. An animal enclosure construction including:
 a. a plurality of vertically disposed rectangular panels defining walls of an enclosure;
 b. each said panel including a grid of wires to define the surface area thereof;
 c. the top, bottom, and sides of each panel defined by pipe elements;
 d. one of said panels having a generally rectangular access opening therein;
 e. a horizontal supporting element spanning the upper portion of said access opening;
 f. a horizontally sliding closure suspendedly supported by said horizontal supporting element;
 g. means carried by said sliding closure to inhibit any swinging motion thereof about a horizontal axis;
 h. said means including a projection downwardly depending from the lowest horizontal portion of the closure;
 i. a pair of parallel pipes mounted on the panel containing said access opening and adjacent the lower portion thereof and defining a guide slot therebetween; and
 j. said projection extending between said parallel pipes.

2. The animal enclosure of claim 1 wherein:
 a. said grid wire is stretched across each panel by vertically disposed tensioning bars, secured to the side pipe elements; and
 b. said sliding closure is formed of top, bottom, and side pipes to which tensioning bars and a grid of wires are secured.

3. The animal enclosure of claim 1 wherein:
 a. said horizontal supporting element is defined by an inverted channel member, and wherein;
 b. said channel is closed at its ends by plates after assembly and location of the sliding panel; and
 c. said wire grid is stretched across each panel by vertically disposed tensioning bars, secured to the side pipe elements.

4. The animal enclosure of claim 3 wherein:
 a. said sliding closure is formed of top, bottom, and side pipes to which tensioning bars and a grid of wires are secured; and
 b. said inverted channel member is secured to the upper pipe of its panel by a plurality of plates welded to both the said upper pipe and to the said channel.

5. The animal enclosure of claim 1 wherein the vertical distance between the top of the sliding closure and the bottom of its horizontal supporting element is greater than the distance the said pintle extends between said parallel pipes, whereby the pintle may be positioned between the pipes after the sliding closure is suspended.